(12) United States Patent
Kaufman et al.

(10) Patent No.: US 11,580,142 B2
(45) Date of Patent: *Feb. 14, 2023

(54) LOCATION DATA INTEGRATION AND MANAGEMENT

(71) Applicant: IGNITE LOCAL SEARCH SOLUTIONS, INC, Austin, TX (US)

(72) Inventors: Ari Kaufman, Denver, CO (US); Jacob Meier, Denver, CO (US); Daniel Weiner, Denver, CO (US)

(73) Assignee: Ignite Local Search Solutions, Inc, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/363,391

(22) Filed: Jun. 30, 2021

(65) Prior Publication Data

US 2021/0342373 A1 Nov. 4, 2021

Related U.S. Application Data

(63) Continuation of application No. 16/689,955, filed on Nov. 20, 2019, now Pat. No. 11,080,312, which is a continuation of application No. 14/461,377, filed on Aug. 16, 2014, now abandoned.

(60) Provisional application No. 61/866,970, filed on Aug. 16, 2013.

(51) Int. Cl.
 *G06F 16/29* (2019.01)

(52) U.S. Cl.
 CPC .................................. *G06F 16/29* (2019.01)

(58) Field of Classification Search
 None
 See application file for complete search history.

(56) References Cited

U.S. PATENT DOCUMENTS

| | | | |
|---|---|---|---|
| 8,868,522 B1 * | 10/2014 | Zennaro | G06F 16/29 |
| | | | 707/694 |
| 2010/0238070 A1 * | 9/2010 | Harper | G01S 19/12 |
| | | | 342/357.46 |
| 2013/0137463 A1 * | 5/2013 | Busch | G06Q 30/0245 |
| | | | 455/456.3 |

(Continued)

OTHER PUBLICATIONS

Notice of Allowance dated Mar. 31, 2021, filed in U.S. Appl. No. 16/689,955, pp. 1-7.

(Continued)

*Primary Examiner* — Christopher J Raab

(57) ABSTRACT

A system and associated methodology manages localization data. According to one embodiment of the present invention a primary set of data associated with one or more specific locations is imported and matched to a predefined format. Thereafter external, secondary, data associated with each of the localities listed in the primary data set is collected from a plurality of third party location service providers. With the collected secondary data matched to the same predefined format a comparison is made between the plurality of secondary data sets and the primary data set. Differences between the data sets are identified and the primary data set modified as necessary. Thereafter, normalized data from the modified primary data set is exported to the third party location service providers to enhance consistency and reliable of locational data.

10 Claims, 14 Drawing Sheets

(56) References Cited

U.S. PATENT DOCUMENTS

| | | | | |
|---|---|---|---|---|
| 2013/0316696 A1* | 11/2013 | Huang | .............. | H04W 52/0212 |
| | | | | 455/419 |
| 2014/0280645 A1* | 9/2014 | Shuman | .................. | H04L 51/20 |
| | | | | 709/206 |
| 2014/0357198 A1* | 12/2014 | Ye | ........................... | H04W 4/02 |
| | | | | 455/73 |
| 2014/0372420 A1* | 12/2014 | Slep | .................... | G06F 16/9537 |
| | | | | 707/724 |

OTHER PUBLICATIONS

Response to Non-Final Office Action dated Mar. 16, 2021, filed in U.S. Appl. No. 16/689,955, pp. 1-10.
Non-Final Rejection dated Oct. 16, 2020, filed in U.S. Appl. No. 16/689,955, pp. 1-8.

\* cited by examiner

FIG.5

FIG.6

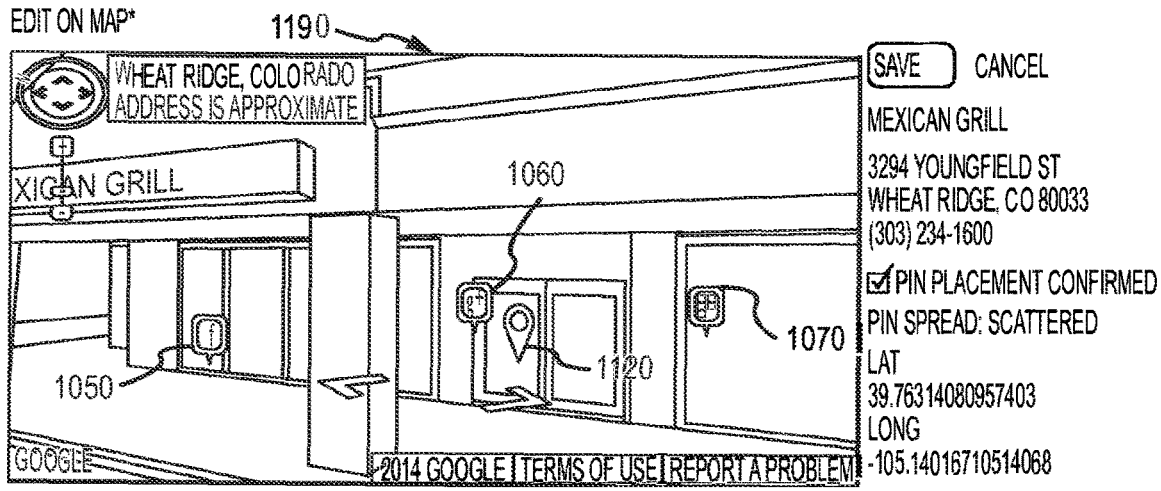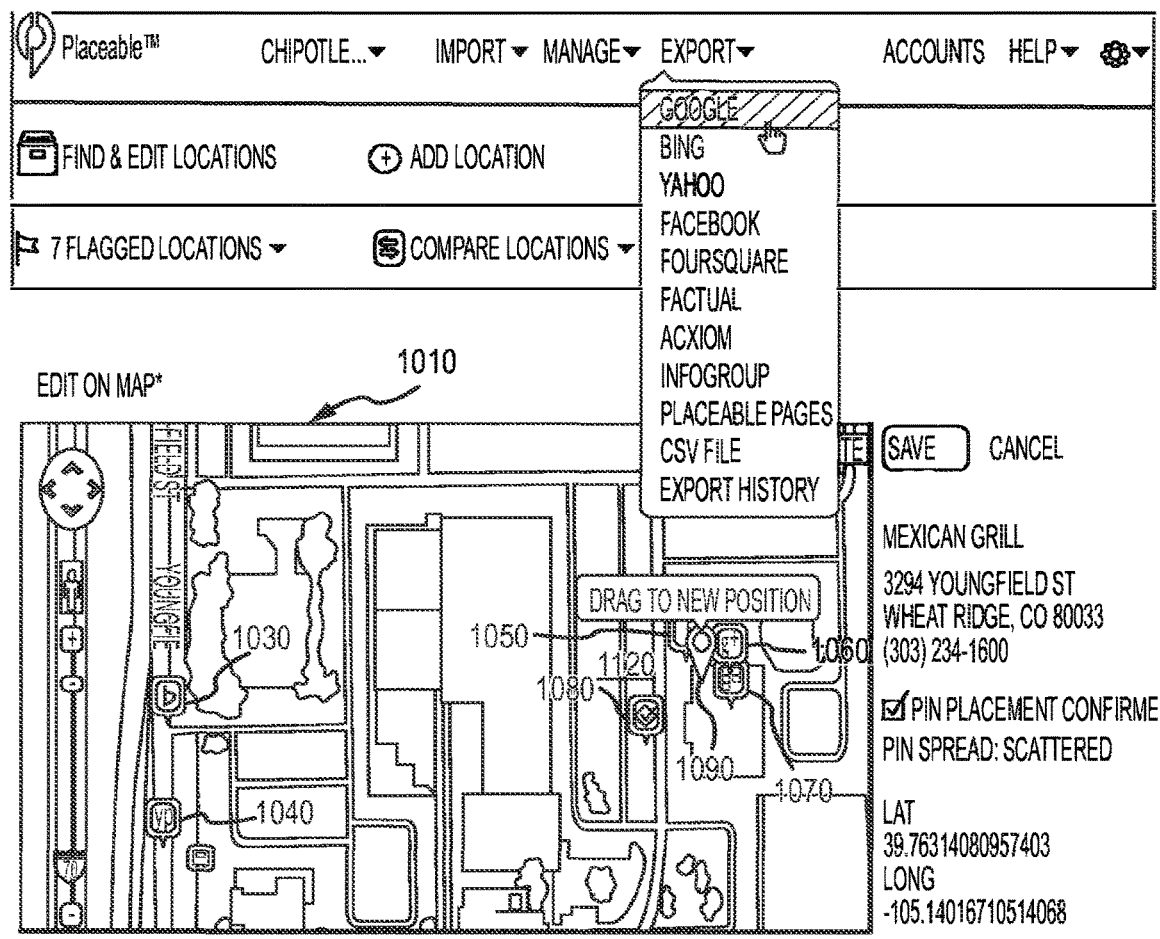
FIG.11

SEARCH BY NAME, ADDRESS OR ID 🔍  ADVANCED SEARCH    SHOWING 1 LOCATION FOR "PHONE FORMAT CHECK"

MEXICAN GRILL
890 N 54TH ST
CHANDLER, AZ 85226
(480) 783-0200

BASE FIELDS  HOURS  PHOTOS  URLs  MORE FIELDS  COMPARE

SCORE 87  AVERAGE SCORE 76

NAME [MEXICAN GRILL]
LOCATION 📍 33.317676, -111.96848          EDIT ON MAP
STREET [890 N 54TH ST]
STREET 2 [ ]
CITY [CHANDLER]                                                1210
STATE (PROVINCE) [AZ]
POSTAL CODE [85226]
PHONE NUMBER [(480) 783-0200]
UNIQUE ID [26]

1230

MEXICAN GRILL
890 N 54TH ST
CHANDLER, AZ 85226
(480) 783-0200

BASE FIELDS  HOURS  PHOTOS  URLs  MORE FIELDS  COMPARE

BRAND NAME
    MEXICAN GRILL

🏁 G+ GOOGLE

MEXICAN GRILL ✉   ★★★★☆ 35 REVIEWS
    890 N 54TH ST
    CHANDLER, AZ 85226
    (480) 783-0200 ───── 1240

🏁 YELP

MEXICAN GRILL ✉   ■■■■□ 46 REVIEWS
    890 N 54TH ST
    CHANDLER, AZ 85226
    (480) 783-0200 ───── 1250

🏁 FOURSQUARE

MEXICAN GRILL ✉   4926 TOTAL CHECK-INS
    890 N 54TH ST
    CHANDLER, AZ 85226
    (480) 783-0200 ───── 1260

FIG. 12

LOCATION DATA INTEGRATION AND MANAGEMENT

RELATED APPLICATION

The present application relates to and claims the benefit of priority to U.S. Provisional Patent Application No. 61/866,970 filed 16 Aug. 2013 which is hereby incorporated by reference in its entirety for all purposes as if fully set forth herein.

BACKGROUND OF THE INVENTION

Field of the Invention

Embodiments of the present invention relate, in general, to accessibility and usability of locational data and more particularly to systems and processes to increase the accuracy and reliably of locational data.

Relevant Background

One of the most widespread uses of geocoding technology is in store/dealer locators. Businesses use geocoded data to ascertain proximity to potential customers, distance to suppliers and competitors, service areas and delivery routes. And consumers use geocoding to find a restaurant, pet store or the nearest coffee shop. Indeed, more and more consumers search for retail establishments using a mapping application than a general search engine. In many cases the mapping application can provide key data with which the consumer uses to make a selection as to which establishment they will engage. Accuracy of such data, including the location of the establishment, is critical.

One of the challenges for marketers working with location data is that there are many different uses and destinations for such data and each requires different formats and required fields. Search and Social sites including Google®, Facebook®, Yahoo®, Bing®, Foursquare®, and Yelp® all have specific format and data requirements. Other less known but equally as important business applications also has unique format and field requirements. And each may represent the location and content data of a single establishment differently.

Marketing platforms use location data for targeting and directing consumers to local outlets through paid search, display, email, and marketing automation tools. But what if the data is inaccurate or missing altogether? For example, 123 N. Main St. may be completely different than 123 S. Main St. Consider a consumer traveling in an unfamiliar city and seeking to locate a retail establishment for lunch. Through a search the individual has located a suitable location and is using a navigation app to arrive at the destination. But upon arrival according to the application the desired location is nowhere in sight. Yet a suitable alternative is close at hand and a sale is lost. Accurate and consistent geocoding is a growing concern in commercial enterprises.

And while retail stores would rather have consumers show up at their front door than the loading dock, the loading dock may be a more accurate representation of the retail establishment's address. This sort of error is compounded by the fact that third parties may each associate a technically correct address with different latitude and longitude coordinates. As a result, the representation of the same address among various third party mapping applications can vary resulting in a wide disparity in the rendering of a point of interest. Such inconsistencies can have a dramatic impact on sales, consumer recognition and business efficiencies. In the same manner, inaccuracy with respect to secondary fields of data can also adversely impact the success of a retail establishment. Having an inaccurate telephone number or hours of operation can deter customers from interacting with a retail location.

What is needed is a system and associated methodology to collect correct locational information, validate and cleanse the data, and compare it against third party sources so as to produce a highly reliable and accurate body of information that can be conveyed consistently.

The system and methodology of the present invention addresses these and other needs of the prior art for collecting, validating, modifying and exporting improved locational data.

SUMMARY OF THE INVENTION

A system and associated methodology manages localization data. According to one embodiment of the present invention a primary set of data associated with one or more specific locations is imported and matched to a predefined format. Thereafter external, secondary, data associated with each of the localities listed in the primary data set is collected from a plurality of third party location service providers. This includes the identification and collection of potential duplicate sets of secondary data. That is, third party representation of separate locations when in fact they are the same location. With the collected secondary data mapped to the same predefined format as the primary set of data, a comparison is made between the plurality of secondary data sets and the primary data set. Differences between the data sets are identified and the primary data set modified as necessary. Thereafter, normalized data from the modified primary data set is exported to the third party location service providers to enhance consistency and reliable of locational data.

According to one embodiment of the present invention a comparison metric is generated that identifies differences between the primary and secondary data sets. Responsive to the comparison metric reaching a predefined threshold one or more aspects of the primary data set is modified automatically. Moreover the metrics regarding comparison of the primary data to that of secondary data sets and their matching between the sets is historically tracked building a foundation of data on which to base modification decisions.

Additional features of the invention can include, a method of localization data, wherein the modified primary set of data includes a modified set of geospatial coordinates based on differences between the primary and plurality of secondary sets of geospatial coordinates. The modified sets of geospatial coordinates are, in another embodiment of the present invention, based on weighted combinations of differences between the primary and the plurality of secondary sets of geospatial coordinates. The data is then normalized according to a predefined format prior to be exported to a designated third party.

According to another embodiment of the invention, a system for management of localization data includes a comparison engine operable to compare the primary and secondary set of geospatial coordinate data to form a comparison metric. The comparison engine is further operable to compare each of the plurality of secondary sets of geospatial coordinates with the primary set of geospatial coordinates to form a comparison metric. A modification engine then operates to modify the primary set of data and create a modified primary set of data based on the secondary set of data; the modifications being based on a weighted combination of differences between the primary set of geospatial coordinates and each of the plurality of secondary sets of geospatial coordinates.

Other features include, a normalization engine operable to convert the modified primary set of data to a predefined format consistent with one or more third parties. An export engine is then used to export the modified set of primary data.

The features and advantages described in this disclosure and in the following detailed description are not all-inclusive. Many additional features and advantages will be apparent to one of ordinary skill in the relevant art in view of the drawings, specification, and claims hereof. Moreover, it should be noted that the language used in the specification has been principally selected for readability and instructional purposes and may not have been selected to delineate or circumscribe the inventive subject matter; reference to the claims is necessary to determine such inventive subject matter.

BRIEF DESCRIPTION OF THE DRAWINGS

The aforementioned and other features and objects of the present invention and the manner of attaining them will become more apparent, and the invention itself will be best understood, by reference to the following description of one or more embodiments taken in conjunction with the accompanying drawings, wherein:

FIG. 5 is a rendering of a dashboard, according to one embodiment of the present invention, for importing a primary data set into a localization data management system;

FIG. 6 is a rendering of a dashboard for the validation and matching of data fields of a primary data set against a standardized template according to one embodiment of the present invention;

FIG. 11 is a street view and corresponding geospatial rendering of the locality of FIG. 10 with a corrected geocodes from a primary data set, according to one embodiment of the present invention;

FIG. 12 depicts a comparison of an inaccurate and/or incomplete primary set of data with that of a plurality of secondary sets of data collected from one or more third party location service providers according to one embodiment of the present invention;

Figure 1:
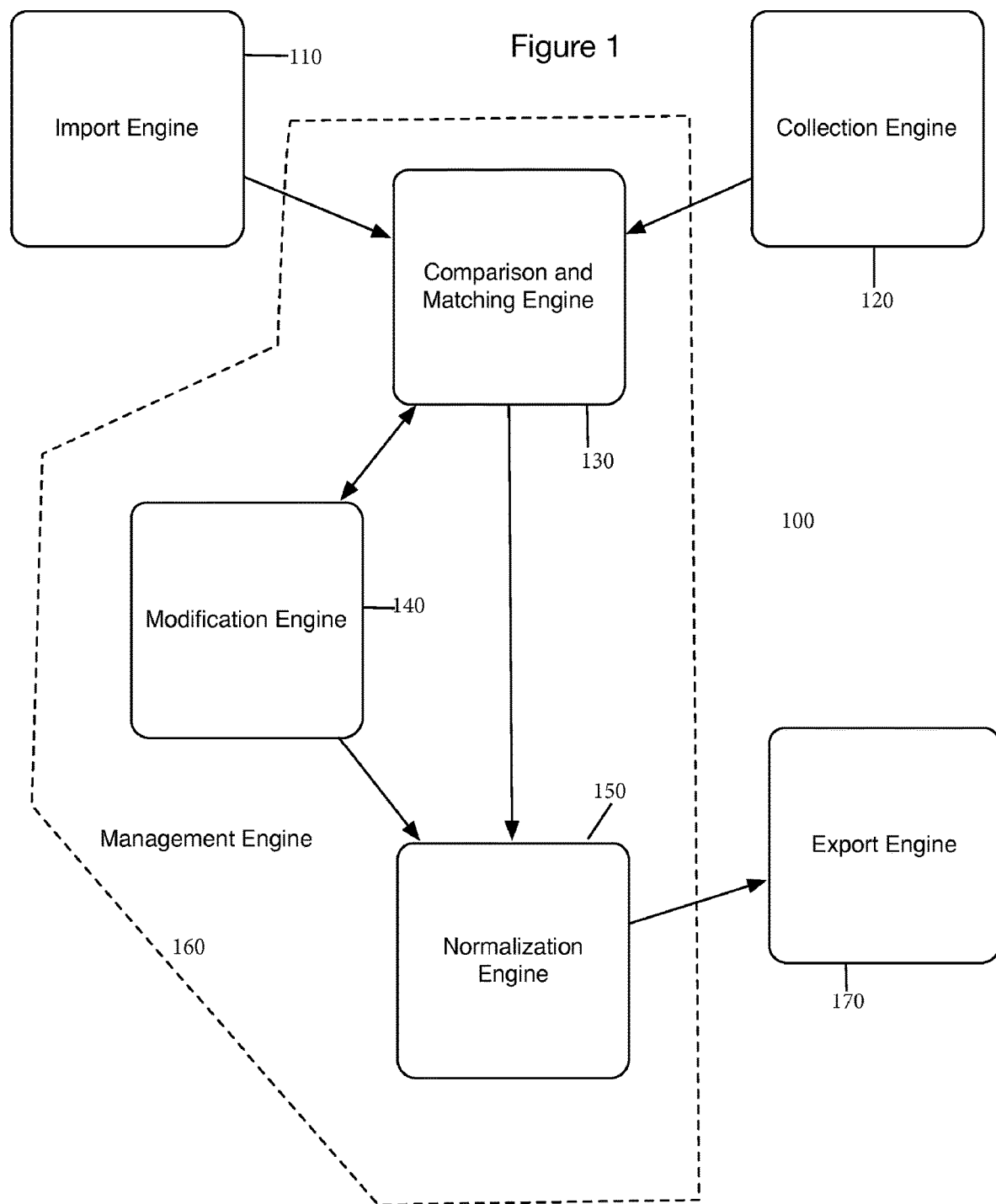
FIG. 1 presents a high-level block diagram of a system for localization data management according to one embodiment of the present invention.

The Figures depict embodiments of the present invention for purposes of illustration only. One skilled in the art will readily recognize from the following discussion that alternative embodiments of the structures and methods illustrated herein may be employed without departing from the principles of the invention described herein.

DESCRIPTION OF THE INVENTION

A system and associated methodology for management of localization data compares a primary set of data to collected third party information related to the same locale. Based on user inputs and evaluation of a comparison metric to a predefined threshold, locational data can be corrected, normalized and exported to a plurality of third parties consistently, reliably and efficiently.

A system, according to one embodiment of the present invention, establishes a primary data source from a customer or a client. The primary data is imported and mapped to a standard set of fields that are representative of data normally associated with localization data. If necessary, data is geocoded according to a standard format and gaps in the information generally associated with locational data is identified. Third party data associated with each locality is thereafter collected and used to score the validity and accuracy of the primary data source. A scoring, or comparison metric as it is hereafter referred, is determined and while the comparison metric is not necessarily an indication of erroneous data fields it is an indication of disparities between that which a clients holds to be representative locational data and that of one or more third parties that present locational data to the public.

Locational data associated with the primary data source that is significantly different from a collected body of third party information can, according to one embodiment of the present invention, be changed automatically based on a comparative analysis of third party data. The user can also validate the accuracy of the primary data manually in light of third party data using a workbench or dashboard. Thereafter the validated and, if necessary, modified data is normalized and presented to various third party applications in a format consistent with those third parties.

Embodiments of the present invention are hereafter described in detail with reference to the accompanying Figures. Although the invention has been described and illustrated with a certain degree of particularity, it is understood that the present disclosure has been made only by way of example and that those skilled in the art can resort to numerous changes in the combination and arrangement of parts without departing from the spirit and scope of the invention.

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Like numbers refer to like elements throughout. In the figures, the sizes of certain lines, layers, components, elements or features may be exaggerated for clarity.

The terminology used herein is for the purpose of describing particular embodiments only and is not intended to be limiting of the invention. As used herein, the singular forms "a," "an" and "the" are intended to include the plural forms as well, unless the context clearly indicates otherwise. Thus, for example, reference to "a component surface" includes reference to one or more of such surfaces.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and A and B are both true (or present).

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

It will be also understood that when an element is referred to as being "on," "attached" to, "connected" to, "coupled" with, "contacting", "mounted" etc., another element, it can be directly on, attached to, connected to, coupled with or contacting the other element or intervening elements may also be present. In contrast, when an element is referred to as being, for example, "directly on," "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Included in the description are flowcharts depicting examples of the methodology that may be used to manage localization data. In the following description, it will be understood that each block of the flowchart illustrations, and combinations of blocks in the flowchart illustrations, can be implemented by computer program instructions. These computer program instructions may be loaded onto a computer or other programmable apparatus to produce a machine such that the instructions that executes on the computer or other programmable apparatus create means for implementing the functions specified in the flowchart block or blocks. These computer program instructions may also be stored in a computer-readable memory that can direct a computer or other programmable apparatus to function in a particular manner such that the instructions stored in the computer-readable memory produce an article of manufacture including instruction means that implement the function specified in the flowchart block or blocks. The computer program instructions may also be loaded onto a computer or other programmable apparatus to cause a series of operational steps to be performed in the computer or on the other programmable apparatus to produce a computer implemented process such that the instructions that execute on the computer or other programmable apparatus provide steps for implementing the functions specified in the flowchart block or blocks.

Accordingly, blocks of the flowchart illustrations support combinations of means for performing the specified functions and combinations of steps for performing the specified functions. It will also be understood that each block of the flowchart illustrations, and combinations of blocks in the flowchart illustrations, can be implemented by special purpose hardware-based computer systems that perform the specified functions or steps, or combinations of special purpose hardware and computer instructions.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve the manipulation of information elements. Typically, but not necessarily, such elements may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," "words", or the like. These specific words, however, are merely convenient labels and are to be associated with appropriate information elements.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

FIG. 1 presents a high-level block diagram of a system for localization data management according to one embodiment of the present invention. The system 100 includes an import engine 110, a collection engine 120, a management engine 160 and an export engine 170. The management engine 160 is further comprised of modules operable to compare and match localization data 130 as well as modify 140 such data when necessary. Lastly the management engine 160 includes a normalization engine 150 to place localization data into third party specific format prior to exportation.

The import engine 110 includes, in one embodiment, a portal by which a primary data set is supplied by a client. Data can be introduced into the system in a variety of formats; raw data fields and spreadsheets including a CVS file having locational data are also imported. The import engine 110 accepts the information in client format and maps the data to a predefined format of industry-accepted fields. These core sets of fields serve as the basis for each location and include, among other things, name, address, location, phone number, operating hours, etc. The import engine 110 maps the supplied data to each of these fields regardless of how they are named or arranged based on common characteristics. For example an address field typically includes a numerical value, a name of street, avenue or boulevard as well as city, state, country and postal code. While each client's format and label may differ the import engine 110 parses the data so as to place it in the correct field. And in some instances data presented by a client is transformed into manageable and understandable packets so that it can be property mapped into the standard fields.

The present invention also accepts and store other information that, while not considered necessary with respect to localization data, is nonetheless descriptive of the clients retail or business establishment. Information of this type can include URLs, service descriptions, menus, directions, etc.

One aspect of the present invention is to provide feedback to the client as to the depth and health of the client's locational data. Accordingly, the primary data set is analyzed against a set of metrics to determine if the data provides basic information such as name, brand, address, phone, etc. and well as completeness. For example the data supplied may be missing a basic field such as hours of operation. At the same time, while the data set includes a field for phone number for each location may of the localities may find this information to be absent indicating that the primary data set in incomplete. According to one embodiment of the present invention the import engine 110 determines and conveys to the client a metric representing a degree of basic information that has been provided as well as a degree of completeness of that information. This internal data metric provides the client with feedback as to the robustness and completeness of their primary data set, exclusive of its comparison to any third parties. Entries that are either incomplete or lacking in basic information are also flagged so that the client can supply additional information to aid in the effectiveness of the system.

Client imported data, hereafter referred to as a primary data set, is retained in a database and modified as necessary. In addition to storing the data supplied by the client it may be necessary to geocode one or more locations. While the import engine 110 and system 100 is capable of accepting client presented geocodes, the import engine 110 is also operable to geocode supplied addresses into an exact latitude and longitude coordinates (or similar geospatial codes) that are needed for mapping and positioning.

Having gained a primary set of data from the client that is mapped to a predefined or standard set of fields; the system for management of localization data 100 further collects third party localization data via the collection engine 120. Each entry of a client's primary set of data includes a specific locality. That locality may represent a retail establishment or a similar commercial location. According to one embodiment of the present invention, third party locational data of the same locality is collected and compared to the primary set of data. This plurality of third party secondary data sets each presents a unique representation of the same locality. And in some instances duplicates are identified. That is, representations that appear to be different localities yet are in fact the same location. Despite a client's position as being able to provide the most accurate and reliable source of data regarding one of its localities, third party vendors that provide such locality information develop their data regarding such a locality independently. Each possesses different algorithms, protocols and policies by which it collects, verifies and publishes localization data. As a result significant differences in the data between such third parties can exist and, in some instances, result in the creation of duplicate sets of data. One objective of the present invention is to identify and correct disparities between these localization representations.

Using a locality of the primary data set as a basis for the search, the collection engine 120 will initiate an inquire to third party vendors such as Google®, Bing®, Yahoo®, Foursquare® and the like, to gain secondary localization data consistent with the fields mapped by the primary data set. For example address information, geocodes, hours of operation, branding data and the like for each locality are individually collected and stored.

As will be appreciated by one skilled in the art, not all data sought by the collection engine is readily available from third party sites. While a third party site may provide a graphical representation of a location on a map it may not provide exact geocodes. Thus the collection engine 120 uses a plurality of different inquires to identify data necessary to conduct a robust and effective comparison of localization data.

Figure 2:
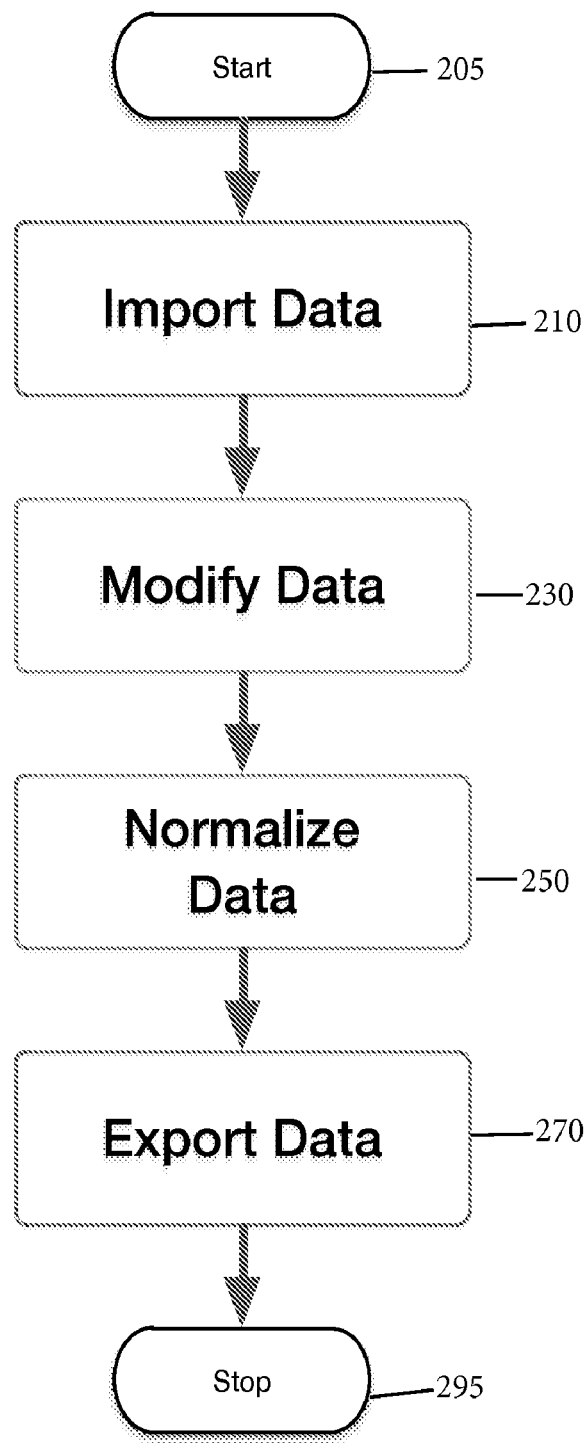
FIG. 2 is a high-level flowchart of a methodology, according to one embodiment of the present invention, to manage localization data.

FIG. 2 presents a basic flowchart, according to one embodiment of the present invention, of a methodology to manage localization data. As shown the process begins 205 with the importation of a primary data set. That data is then compared to collected, secondary, third party data and, if warranted, modified 230. The role of modification of the primary data set falls to the management engine 160 shown in FIG. 1.

As previously discussed the management engine 160 includes three modules or engines. They are the comparison and matching engine 130, the modification engine 140, and the normalization engine 150. Each of these components of the management engine 160 works to create an accurate modified version of the primary data set that can be exported.

One of reasonable skill in the relevant art will appreciate that the depictions of the various engines and modules of FIG. 1 or other drawings herein is arbitrary and does not in any way indicate separable or incongruent characteristics of the present invention. The names and graphical depictions are used as a means to describe and demonstrate the functionality of the present invention and have no direct correlation as to the structure of any underlying software, hardware or firmware necessary to implement the invention claimed hereafter.

Turing attention back to FIG. 1, the management engine 160 receives data from the import engine 110 and the collection engine 120 and engages in a comparison to ascertain a degree of accuracy for each locality. This process begins with the comparison and matching engine 130 that conducts a field-by-field comparison of the primary data set to each third party secondary data set. As with the primary data set, each secondary data set from each third party must also be mapped to a standard set of fields. Once mapped, each field for each secondary data set can be compared against the corresponding field of the primary data set.

The results of this comparison yield an external data metric. This external data metric combined with the internal data metric and a yet to be described geocode comparison, to arrive at an overall comparison metric or score. This score provides the client with an indication of the overall health of their locational data and how well they are effectively providing locational data regarding their establishments to the public.

As mentioned, the comparison engine 130 analyzes for a locality each field of a secondary data set against the same field of the primary data. When a difference is identified that field and third party source is flagged as being different from the primary source. For example, the phone number listed by the third party for a certain locality may differ than what is provide by the primary data source. Yet another third party source of information may have the correct telephone number but the hours of operation are incorrect. Each of these third party sources would be flagged and the aberrant fields highlighted.

Another feature of the present invention is the comparison of pin placement for each locality. Pin placement refers to the geocode (latitude and longitude) associated with each locality. It is possible and often likely that the geocode of the primary data source differs from one or more of the geocodes of the secondary data set. This is true even when each secondary data set includes the same address. According to one embodiment of the present invention, the comparison and matching engine 130 identifies discrepancies with pin placements between the primary data set and one or more of the secondary data sets provided by third parties. As with external data, differences in pin placement are flagged so that the client can review and if necessary correct the pin placement of the primary data source.

Comparison of external data is, as described, distinct. A mistake found in a phone number or an address is flagged as being in accurate and presented for correction. Pin placement however includes a subjective element. For example, it is highly likely that none of the third party geocodes for a particular locality will exactly match the geocode in the primary data set. Yet a certain degree of difference is likely acceptable. For example, if a geocode for a secondary data set is within 10 feet of that of the primary data set, and both are near the actual location, it is likely within a range of accuracy acceptable by the client. Similarly a secondary geocode that presents a pin ½ mile from the true location of the establishment presents a different scenario.

A similar challenge is presented when a plurality of geocodes presented by third parties appear to be consistently different than the geocodes of the primary data set. According to one embodiment of the present invention the comparison and matching engine 130, in conjunction with the modification engine 140, determines, based in one embodiment on a weighted average of differences among the geocodes of the primary data set and the secondary data sets, an accepted geocode. This accepted geocode could differ from any of the presented geocodes including that of the primary geocode. And according to one embodiment of the present invention the modification engine can not only present revised data to the applicable third parties but also revise the primary data set.

The modification engine 140 and the comparison and matching engine 130 can also identify outliers that are not used in such a determination. Moreover each third party representation of a particular value may not be given equal weight. One of reasonable skill in the relevant art will recognize that a primary data set may possess thousands of localities. And while it is possible that for each locality a user may review how the primary data set differs from each of the secondary data sets collected from third parties, such an endeavor is often impractical. The present invention captures third party data and analyzes that data along with the primary data provided by the client to determine the most likely and most accurate representation of localization data. And while a weighted average of the collected data can be used to determine a new or modified set of primary data, other techniques known to one of reasonable skill in the relevant art can be used and are contemplated by the present invention.

In yet another embodiment of the present invention the primary data set can include verified geocodes. While most geocodes are determined based on an location's address, one embodiment of the present invention enables a client to accept a verified set of coordinates from a trusted source. For example a client may instruct an employee at the site in question to transmit exact geocodes from the establishment. The data can then be entered as being a verified set of geocodes inhibiting any further modification regardless of the comparison metric.

Once modified (or verified), the primary set of data must be exported to the third parties. However each third party possess a specific format for such localization information. The normalization engine 150 accepts data from the comparison and matching engine 130 as well as the modification engine 140 to create a normalized 250 set of data. That data is thereafter exported 270 via the export engine 170 to one or more third parties for consideration and implementation.

Turing attention back to FIG. 2, the management of localization data begins 205 with the importation and collection 210 of primary and secondary data sets respectively. A comparison takes place, metrics are determined and in some cases the primary set is modified 230 to reflect a more accurate statement of the locality. The now modified primary data set is then normalized 250 so that is can be exported 270 to one or more third parties, each in a unique format, ending the process 295.

Figure 3:
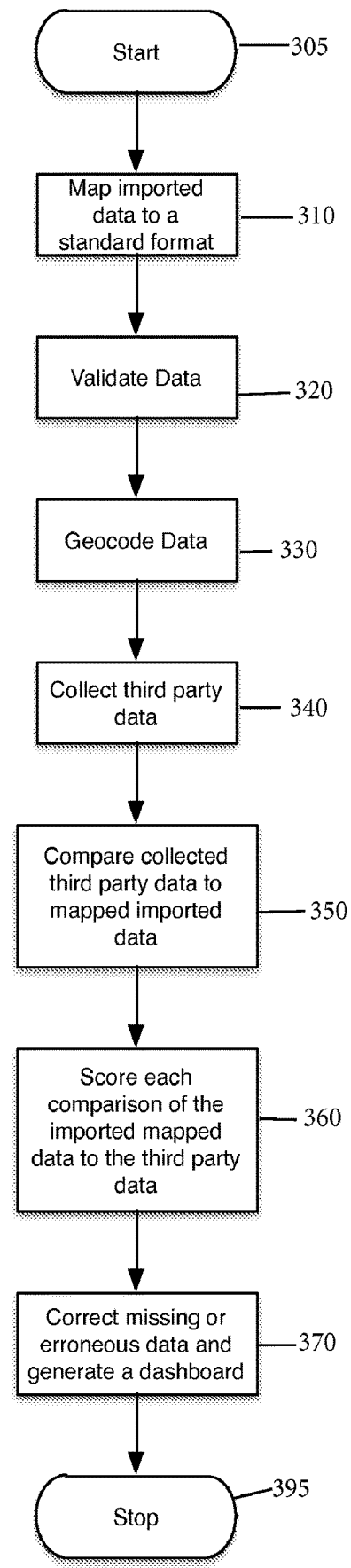
FIG. 3 is a flowchart of another method embodiment for management of localization data according to the present invention.
Figure 4:
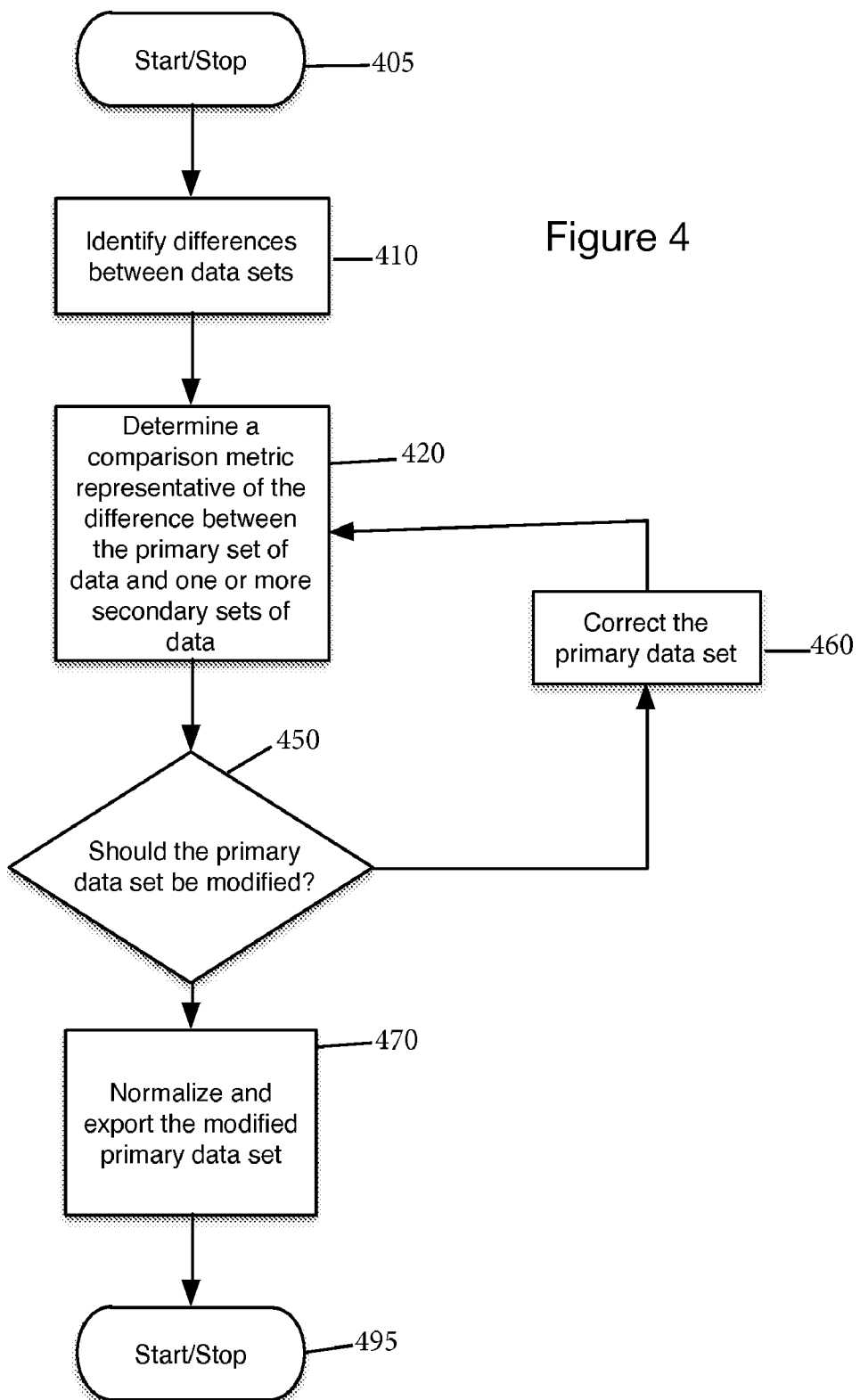
FIG. 4 is a flowchart for identifying differences between a primary set of location data and a plurality of secondary sets of location data derived from third party location services according to one embodiment of the present invention.

FIGS. 3 and 4 are flowcharts presenting a high-level outline of the process by which localization data is managed according to the present invention. The process outlined in FIG. 3 beings 305 with the mapping 310 of imported data to a standard format as previously described. The primary data set is thereafter validated 320 against industry norms for locational data to determine whether the primary data set lacks certain fields and if certain entries are simply absent. In situations in which geocode data is not provided the addresses provided in the primary data set are geocoded 330 so as to provide a primary set of latitude and longitude coordinates.

For each locality within the primary set of data, third party data is thereafter collected 340. The data is also imported into a standard format so that similar fields of data can be compared. The collected third party data is then compared 350 to the primary data set to identify differences between that which the clients possesses and that which is associated with a particular locality by a plurality of third parties. The comparison is scored 360 as is the validation process and analysis of geocodes to arrive at a metric by which a client can assess the health of their localization data. Using third party data and user inputs via a dashboard, missing or erroneous data is corrected 370 so that it can thereafter be normalized and exported, ending the process 395.

FIG. 4 shows an iterative process, according to one embodiment of the present invention, by which the primary data set is modified based on its comparison with third party data. As discussed above, the process begins 405 with the identification of differences between the data sets 410. With both the primary data set and a plurality of secondary data sets each mapped to a standard format, the management system identifies differences in the data for each locality. Using these differences a comparison metric 420 is generated. This metric, while indicative of the health of the primary set of data also can be compared against a predefined threshold to determine whether the primary data set should be modified. These modifications can be with respect to external data or to the geocodes associated with each locality.

If the inquiry 450 as to whether the primary data set should be modified is affirmative, the system, according to one embodiment of the present invention, modifies 460 specific fields of data so at minimize or eliminate the differences. Another analysis is conducted and the process repeated until the primary data set represents an accurate reflection of the locality data.

With no other modifications needed the process concludes 495 with the modified primary data set being normalized and exported 470 to the third parties as necessary.

One skilled in the relevant art will appreciate that determining when to modify the primary set of data based on a plurality of different secondary data sets requires careful analysis. Arguably the provider of the primary set of data is in the best position to provide accurate localization data. However, there may be instances in which based on a compilation of secondary data with respect to the same locality, the accuracy of the primary data is raised into question. The present invention measures such an instance and, when warranted, modifies the primary data set without further input from the user.

FIGS. 5-14 detail an exemplary process by which localization data is imported into the localization management system, third party data is collected and compared to the data, and modifications to the primary data set occur.

FIG. 5 depicts, according to one embodiment of the present invention, the selection and importation of a primary data file. In this example a client, the owner of a restaurant chain with multiple locations, identifies 510 a primary data file that includes basic information regarding each restaurant location. Alternatively the user can drag and drop a file such as a CVS file to an upload portal 520 to achieve the same result. Other means by which to provide a primary set of data are contemplated and should not be viewed as a limitation to the present invention. For example an automated uploading of data from a client site via an API can provide near real time access to newly added fields and changes to locational data. Similarly changes to locational data made by the system of the present invention can be downloaded back to the client site to maintain a consistent set of data across the system interface.

As the data is uploaded the import engine 110 identifies the fields of data 530 associated with each locality according to a set of industry norms. In this case each restaurant listed in the primary data set includes fields such as store code, name, address, city, state, postal code, country code, phone number, fax number, home page URL, hours of operation, latitude, longitude, a category code, images associated with the location and a general description.

Figure 6:
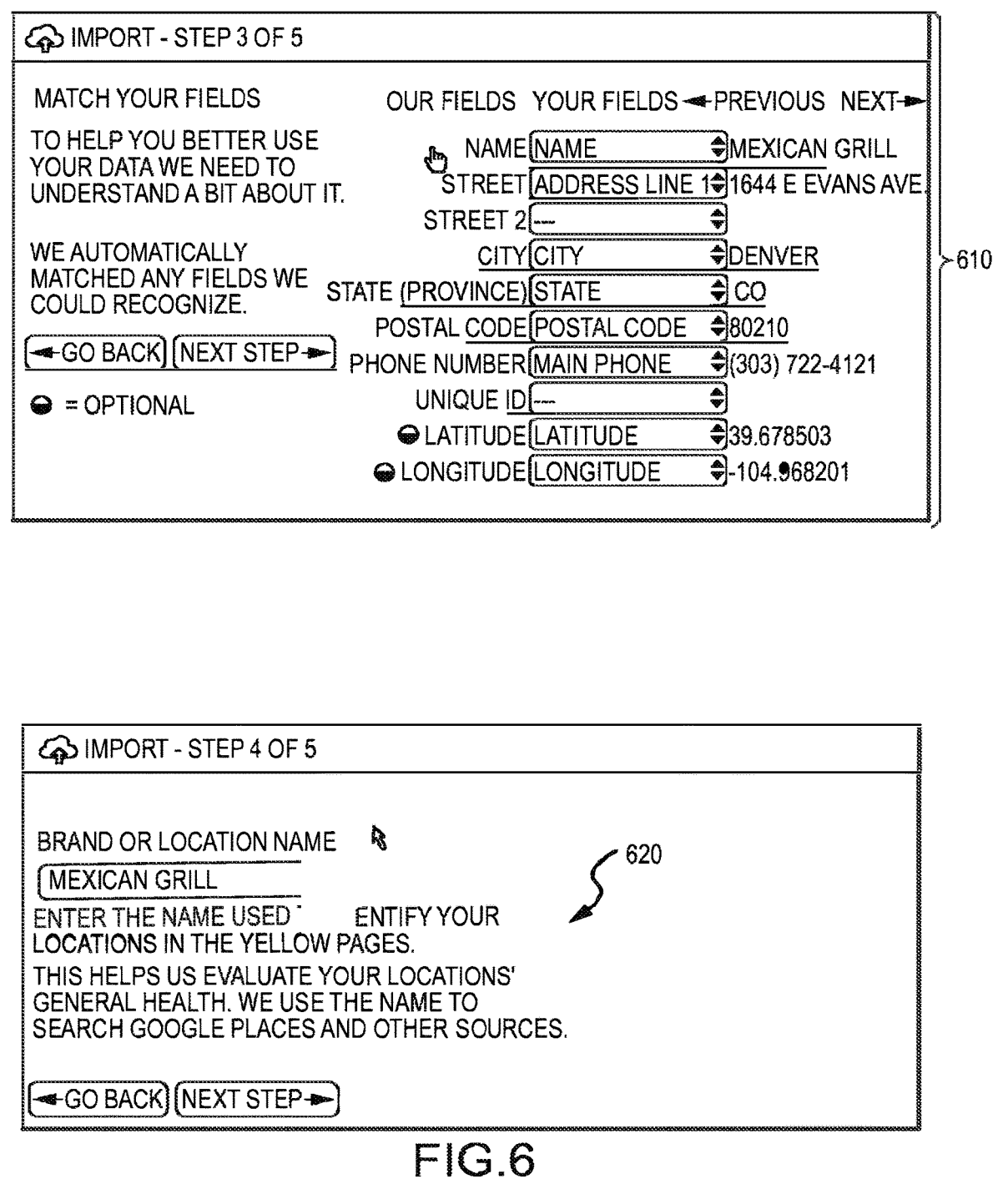

FIG. 6 represents a matching between the plurality of fields identified in the primary data set and those of a predefined standard 610. In many cases the names of fields used by a client are the same as those used in the management system of the present invention, however it is important to align the primary data set with a standardized format to ensure that the later comparison can be properly appreciated.

In this case for example the fields for name, city and postal code appear to be identical while the fields of street (Address Line 1) and phone number (main phone) differ. Note that not all of the information provided within the primary data set maps to the standard format. If necessary additional fields can be added to the standard format if such information is deemed pertinent to the comparison.

A significant aspect of the importation of data is brand or location name recognition. Many companies place significant value on a precise rendering of their brand as associated with locational data. Accordingly part of the importation step is to specifically identify 620 a brand or name that is associated with each locality. In this case the name, "Mexican Grill" is associated with each locality.

Figure 7:
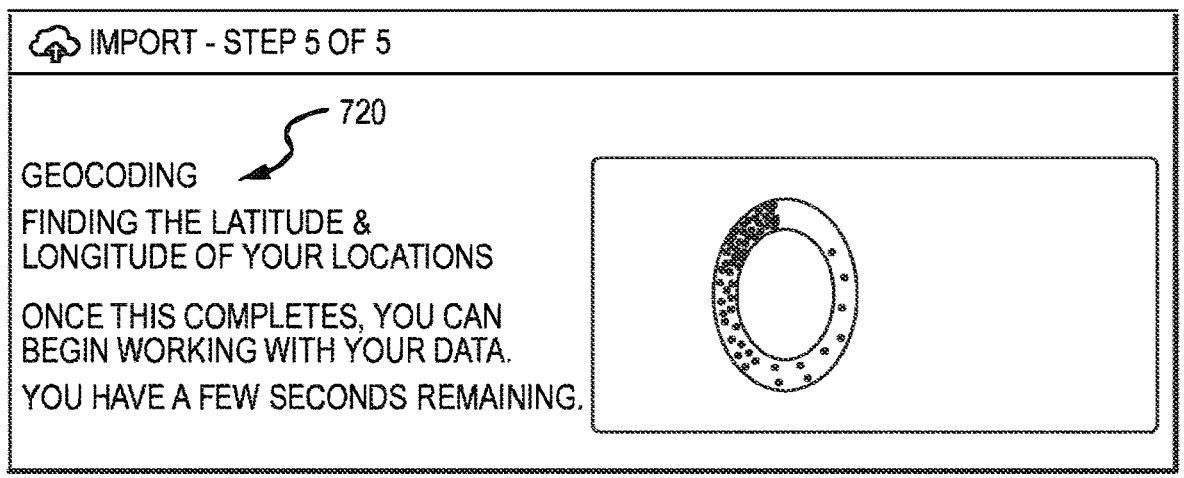
FIG. 7 is a rending of geocoding of the primary locational data set according to one embodiment of the present invention.

Finally the data is geocoded as shown in FIG. 7. Geocoding identifies 720 the latitude and longitude associated with each locality. According to one embodiment of the present invention the address provided by the client as part of the primary data set is verified against a national database of accepted addresses. Once verified the address is geocoded to identify a latitude and longitude. In instances in which no geocoding is provided with the primary data set, the newly determined geocodes are added to the dataset and used for later comparisons. In the case in which a primary data set includes geocodes, the system can, according to one embodiment of the present invention, independently determine a new set of geocodes based on the provided and verified address. If the geocodes associated with the primary data set are significantly different than those determined by the system, the locality is flagged for further review or, according to one embodiment, modified based on the accepted and verified address.

Once the primary data set is imputed into the system 100 the collection engine 120 gathers secondary data sets regarding the same location from a plurality of third parties. Parties such as Google®, Foursquare®, Factual®, Facebook®, Yellow Pages®, Bing®, Yelp® and the like are queried for data regarding a specific locality. The collection engine also searches and identifies potential duplicate secondary data sets. Often the processes used by third parties to create and maintain a secondary data set of a single location branch creating multiple data sets related to the same locality. From the third party's perspective each is a unique location with unique characteristics, yet all refer to the same primary data set. One objective of the present invention is to identify duplicate secondary data sets and merge them into a single, accurate data set consistent with the primary data. With secondary data in hand, the collected data is mapped to the same standard set of fields and compared against the primary data set. The comparison produces, among others things, a dashboard presenting to the user a summary of the comparison analysis.

Figure 8:
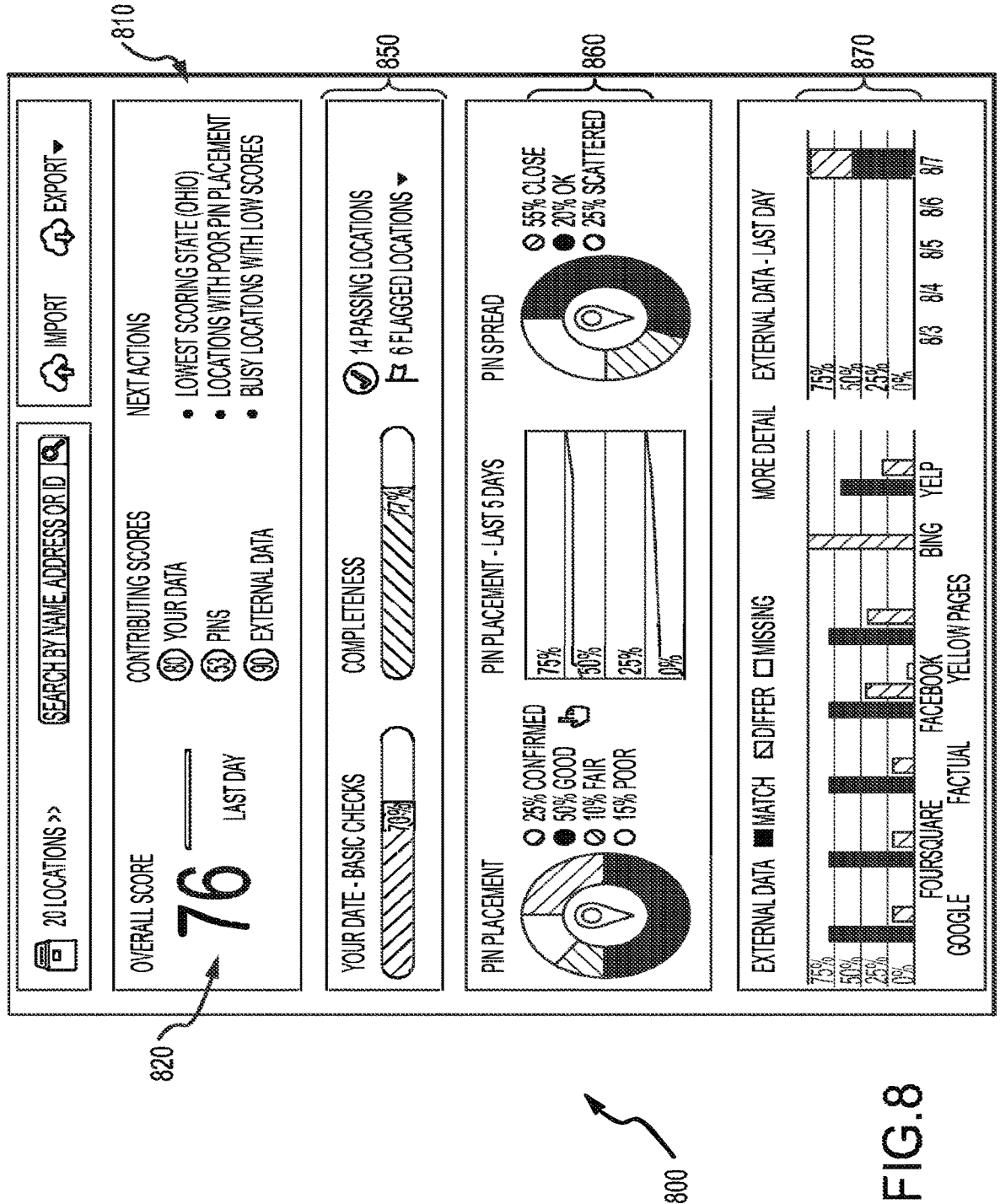
FIG. 8 is a rending of one embodiment of a dashboard for the comparison and management of localization data representing data associated with a primary data set of a locale as compared to a plurality of secondary data sets of the same locale from one or more third party location services.

FIG. 8 presents, according to one embodiment of the present invention, a rendering of a dashboard showing the comparison of a primary set of locational data to a plurality of third party data sets. The dashboard 800 presents a summary panel that includes an overall comparison metric 820 and individual contributing scores. These contributing scores include metrics with respect to data provided 830, the location of the geocodes (pins) 835 and external data 840.

The dashboard also includes more detailed information regarding the completeness and state of the primary data set 850 as well as an overview of the pin placement 860 in comparison to third party data. Lastly the dashboard 800 provides information of how the external data 870 compares to that of the primary data set for each party.

In this case the primary data set includes 20 locations and has an overall score or comparison metric of 76. In this embodiment of the present invention a score of 100 indicates a perfect correlation between the primary set of data and all third party data while 0 indicates a lack of correlation. Other means by which to measure and convey the health of the primary data are indeed possible and contemplated by the present invention.

The dashboard also indicates that the overall score of 76 includes contributing scores of 80 with respect to the completeness and scope of the primary data set, 53 for the correlation of the geocodes associated with the primary data set as compared to those of the third party sources, and 90 for external data. Thus, in this case, one can conclude that the primary data appears to be relatively complete and external data of third party sources appears to mostly match that presented by the primary data set. However, geocoding associated with the third party data sets as compared to that of the primary data set shows significant errors.

Lastly the external data panel 870 depicts inconsistencies between the third party sources. While none of the third party sources exactly matches that of the primary data source, three seem to possess a very high correlation, two are mediocre and two are outliers.

In each instance the dashboard enables the user to drill down to each locality so as to determine how a particular locality differs from the third party data or from the standard format. For example in the primary data set panel 850, 6 locations are flagged as not meeting the standard format requirements for either scope or completeness. One can select each of these locations and determine what data is missing or recorded in error. For example, one of the flagged localities of the primary data set may have the phone field blank despite the fact that the other data is complete.

Figure 9:
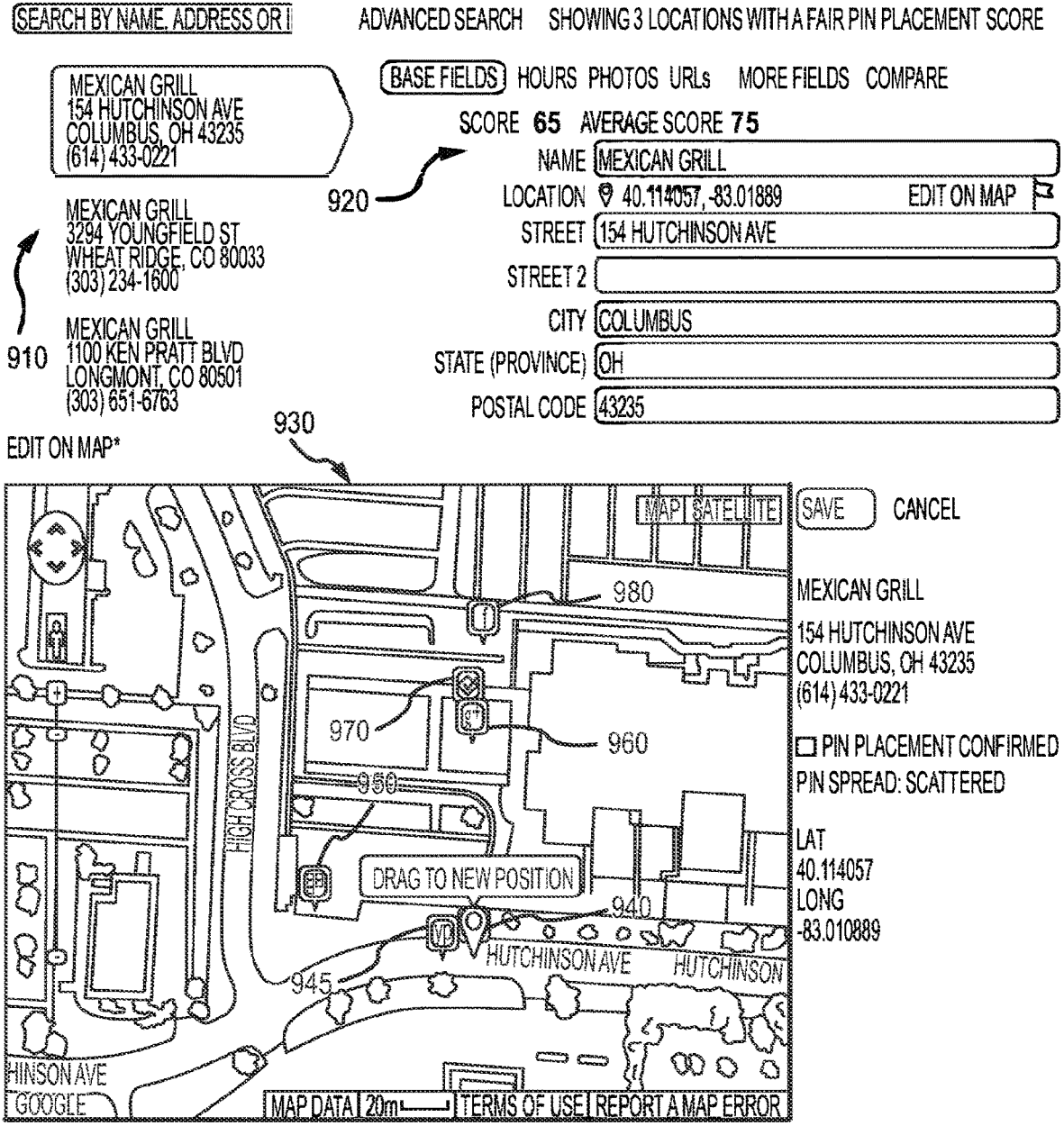
FIG. 9 is a detailed view of a set of primary data set localities having fair pin placement assessments and an associated geospatial representation according to one embodiment of the present invention.

Similarly, the pin placement (geocoding) panel 860 identifies pin placement as confirmed, good, fair or poor. The spread of the pins may also be characterized as being close, acceptable, or scattered. In this case 15% of the localities are associated with poor pin placement, 10% fair, 50% good and 25% confirmed. As shown in FIG. 9 the system enables a user to ascertain more detail as to why a particular locality's pin placement has been assessed as fair, poor or good.

FIG. 9 presents, according to one embodiment of the present invention, a rendering of a pin placement analysis for locational data. In the example shown three locations out of 20 have been determined to possess fair pin placement. Such an assessment is determined, in one embodiment, by assuming that the pin placement of the primary data source is true and determining a collective degree of difference between each of the third party pins to the primary pin. In another embodiment the center of a cluster of pins can be determined to be the true value and differences measured from that location.

In this case three locations 920 have been designated as having fair pin placement. The first of the three Mexican Grills is located at 154 Hutchinson Ave, in Columbus Ohio A satellite image 930 of the vicinity of the address shows the placement of each pin along with a representative avatar. In this case the primary data pin 940 is located on Hutchinson Ave as is the pin associated with YP® 945. The Factual pin 950 is located near the intersection of Hutchinson Ave and High Cross Blvd while the Google® pin 960, Bing® 970 and Facebook® 980 are appear near a building. The graphic thus represents not only a fair rendering of the geocoding but one that is scattered among the various third party data files. In this instance the Google® pin 960 is most representative of the actual location of the restaurant. A user therefore can drag the primary pin 940 to coincide with that of Google 960 and Bing 970. By doing so the primary data set is modified and the flag removed.

Figure 10:
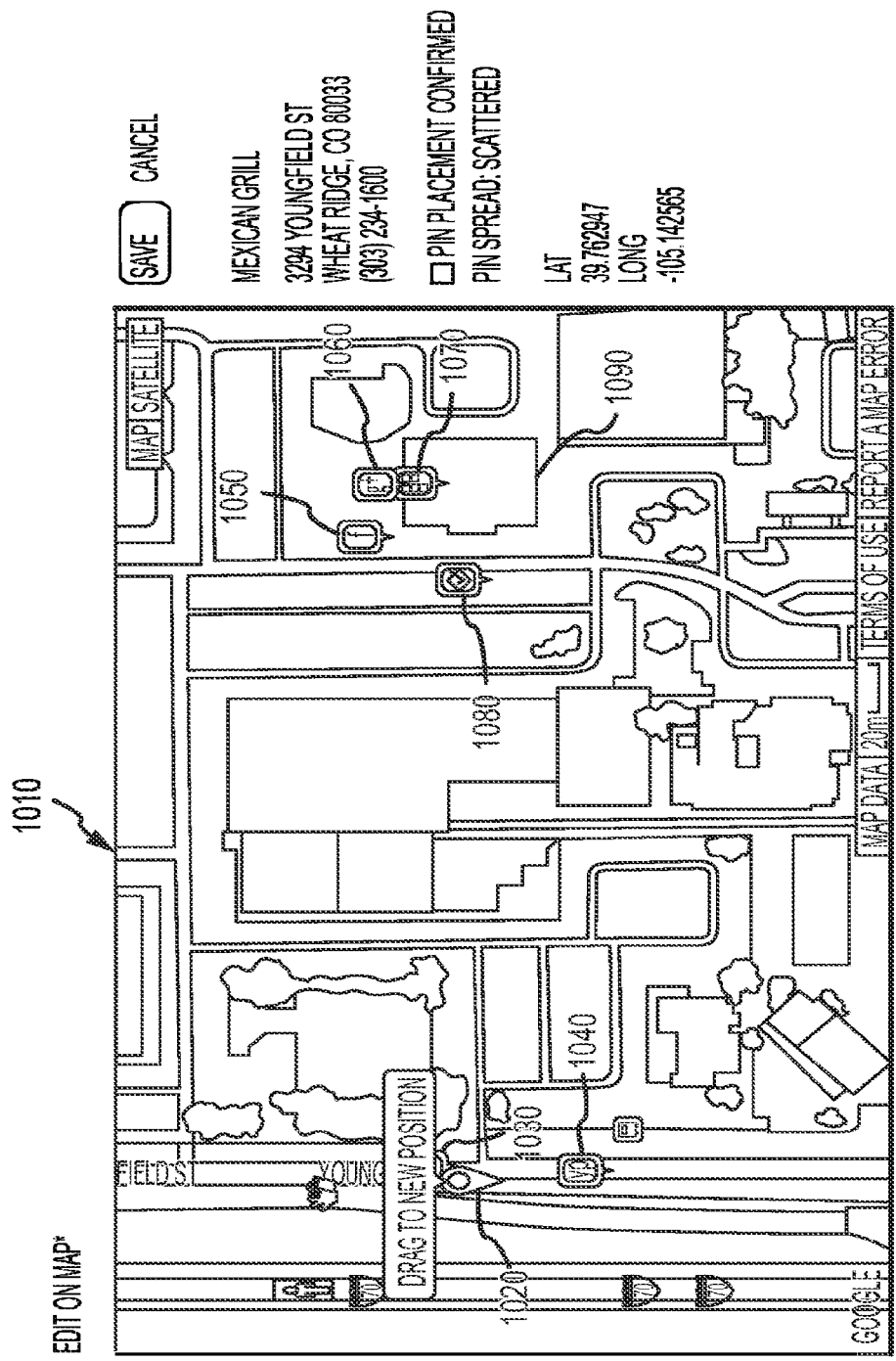
FIG. 10 is geospatial rendition of a plurality of geospatial pins associated with a common location according to one embodiment of the present invention.

FIG. 10 presents another rendering 1010 of a comparison of locational data according to one embodiment of the present invention. In this case the Mexican Restaurant located on Youngfield St. in Wheat Ridge, Colo. 920 is depicted, as are 7 different pin locations. Again the pin placement has been assessed as fair. Here the primary data pin 1020 (as is YP® 1040 and FourSquare® 1030) is located on the street (Youngfield St.) as opposed to being by the retail establishment 1090. However the image in FIG. 10 shows a clear cluster of pins near the same location. In this case Google® 1060, Bing® 1080, Factual® 1070, and Facebook 1050 are near the actual restaurant location 1090. According to one embodiment of the present invention, a comparison of the geocoding data can identify a close correlation of several geocodes at the same locality. Each of the third party sources can additionally posses a rating or score to indicate the confidence on which the system values a particular geocoding. A close correlation by a highly valued third party sources can also be scored and trigger an automatic modification of the primary data geocoding so as to match a central location amongst the cluster.

In this example the assessed value of the geocodes of Google® 1060, Factual® 1070, Facebook® 1050 and Bing® 1080, the fact that each of these pins are clustered within a predefined area, and the low value place on YP® 1040 and Foursquare® 1030, drive the system to automatically relocate the primary data geocoding pin to a central location near the actual position of the restaurant 1090.

FIG. 11 presents two additional views of the interface for repositioning of locational data according to one embodiment of the present invention. FIG. 11 presents a street image of the cluster 1190 of third party pins 1060, 1070, 1050, as well as the repositioned primary pin 1120 near the front door of the retail location. The lower top satellite view 1010 shows a relocated primary data pin 1120 near positioned within the cluster of third party pins 1050, 1060, 1070, 1080.

In such a manner, inaccurate geocoding of the primary data source can be automatically modified. Moreover, the user can be notified of such a modification for later validation rather than having to manually review each pin placement analysis that is flagged as poor or fair before a change occurs. While the present example depicts a primary data source having 20 restaurants, other data sources may have several thousand localities. For example it is estimated that Bank of America manages the location of over 18,000 ATMs worldwide. In instances in which a correlation of trusted third party data indicates that the primary geocode is in error, the information can be efficiently and effectively updated using the present invention.

According to another embodiment of the present invention the same sort of cleansing of data associated with a primary data source can occur with respect to other field. FIG. 12 presents a rendering of missing data being supplied by trusted third party sources. In this case the Mexican Grill in Chandler, Ariz. has been flagged 1210 as lacking a phone number. Indeed the phone number 1230 of the primary data source has only 9 digits.

Figure 13:
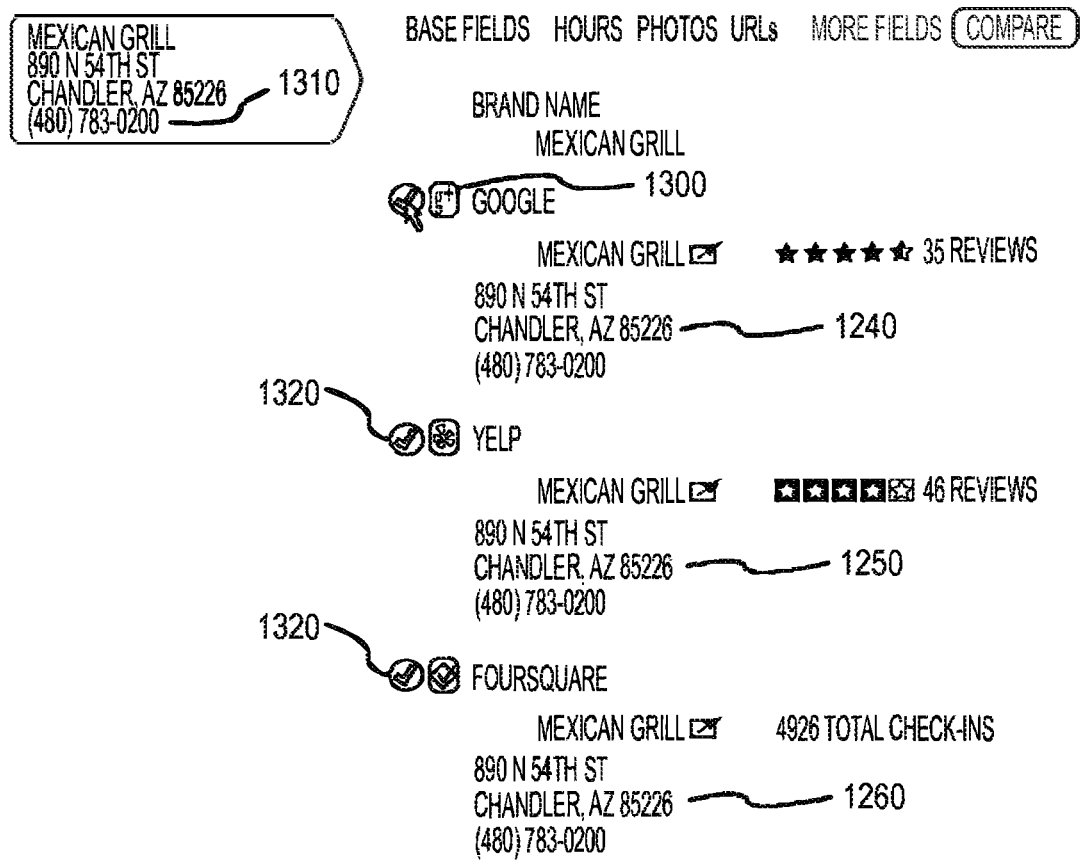
FIG. 13 shows a corrected primary set of data consistent with secondary set of data collected from a plurality of third party location service providers according to one embodiment of the present invention.
Figure 14:
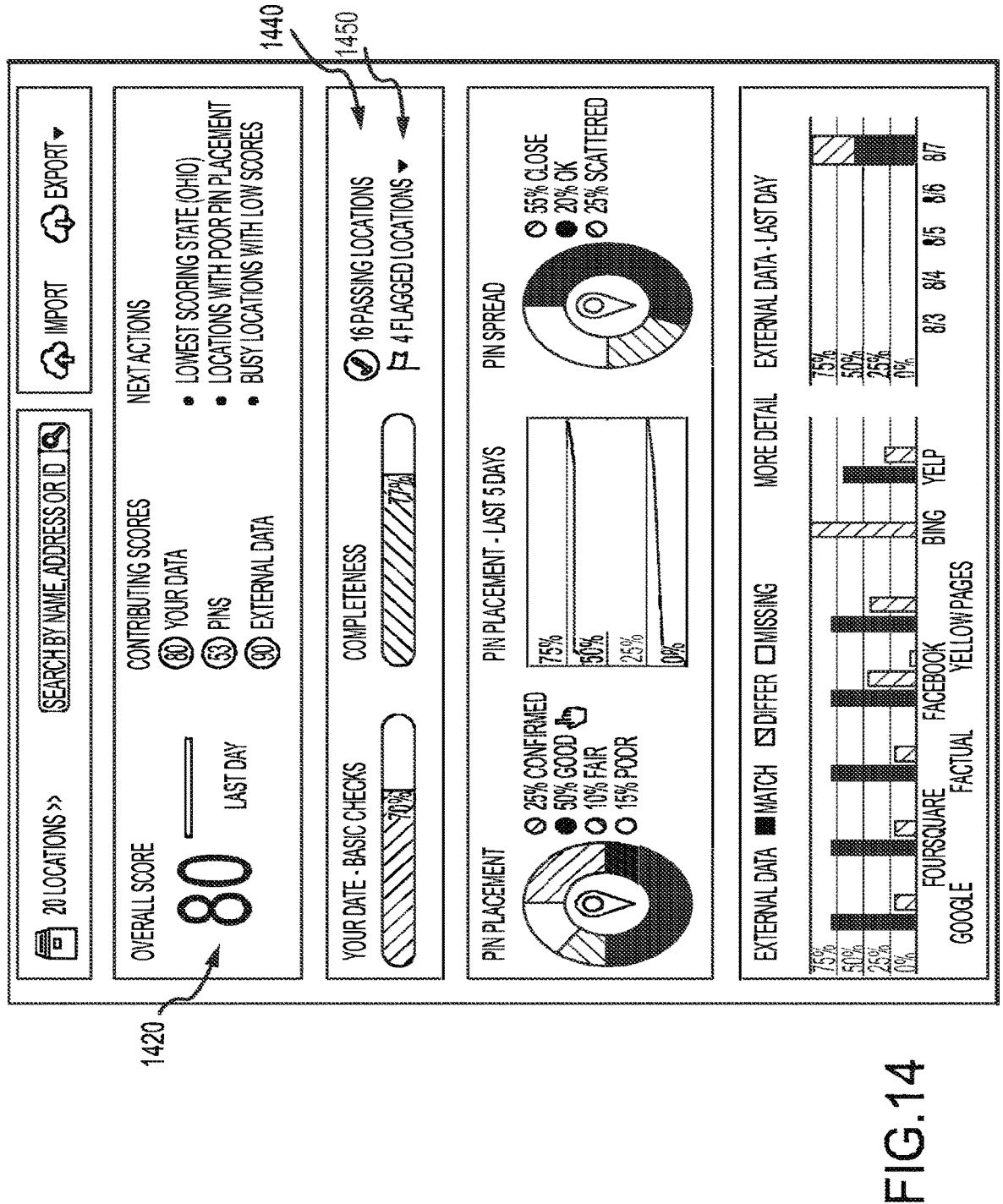
FIG. 14 shows an updated dashboard indicating a revised comparison metric based on updated geocoding and external data according to one embodiment of the present invention.

Yet each of three trusted third party sources 1240, 1250, 1260 indicates not only a high correlation with the data that is present with the primary data source (480-783-020 vs. 480-783-0200) but each is the same. As with geocodes, the reliability of each third party source can be accessed as can the correlation between various third party sources. An algorithm can determine based on the accessed value and correlation whether a predefined threshold has been reached. If so, the values consistently associated with the secondary data sources can be used to modify the primary data source. Once the primary data set 1310 is updated, as shown in FIG. 13, the flags associated with each secondary data set 1320 can be replaced with a validation mark showing a consistency between the data shown on each secondary data set 1240, 1250, 1260 and the primary data set 1310.

One object of the present invention is to import a primary set of localization data and compare that data to a plurality of secondary data sets derived from unique third party sources. Data from each source, be it the primary data set or the secondary data sets, are mapped to a standard set of fields wherein discrepancies are determined and conveyed to a user via a dashboard. The comparison of the primary data set to the plurality of secondary data sets produces a comparison metric indicative of the health of the primary data set. While a user can use the dashboard to investigate and manually correct any error, in one embodiment, the present invention can autonomously determine whether the primary data set should be modified to reflect data held by one or more of the secondary data sets. Once modified, either manually or automatically, the new primary data set can be normalized and exported to each third party in a format uniquely acceptable to that entity.

Another feature of the present invention is the ability to update a particular field among a widespread number of third party location providers. For example a business entity that has elected to increase the hours of operation in a geographic region can modify the primary data set with respect to those localities and then export that data to each third party enterprise that provide locational data. In the same way widespread changes to company wide information can be efficiently submitted to each provider before the third party can ascertain the change through their independent methods.

Those familiar with the relevant art will understand that the invention may be embodied in other specific forms without departing from the spirit or essential characteristics thereof. Likewise, the particular naming and division of the modules, managers, functions, systems, engines, layers, features, attributes, methodologies, and other aspects are not mandatory or significant, and the mechanisms that implement the invention or its features may have different names, divisions, and/or formats. Furthermore, as will be apparent to one of ordinary skill in the relevant art, the modules, managers, functions, systems, engines, layers, features, attributes, methodologies, and other aspects of the invention can be implemented as software, hardware, firmware, or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

In a preferred embodiment, the present invention can be implemented in software and is web based. Software programming code that embodies the present invention is typically accessed by a microprocessor from long-term, persistent storage media of some type, such as a flash drive or hard drive. The software programming code may be embodied on any of a variety of known media for use with a data processing system, such as a diskette, hard drive, CD-ROM, or the like. The code may be distributed on such media, or may be distributed from the memory or storage of one computer system over a network of some type to other computer systems for use by such other systems. Alternatively, the programming code may be embodied in the memory of the device and accessed by a microprocessor using an internal bus. The techniques and methods for embodying software programming code in memory, on physical media, and/or distributing software code via networks are well known and will not be further discussed herein.

Generally, program modules include routines, programs, objects, components, data structures and the like that perform particular tasks or implement particular abstract data types. Moreover, those skilled in the art will appreciate that the invention can be practiced with other computer system configurations, including hand-held devices, multi-processor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

An exemplary implementation of the present invention may also be executed in a Web environment, where software installation packages are downloaded using a protocol such as the Hypertext Transfer Protocol (HTTP) from a Web server to one or more target computers (devices, objects) that are connected through the Internet. Alternatively, an implementation of the present invention may be executing in other non-Web networking environments (using the Internet, a corporate intranet or extranet, or any other network) where software packages are distributed for installation using techniques such as Remote Method Invocation ("RMI") or Common Object Request Broker Architecture ("CORBA").

Configurations for the environment include a client/server network, as well as a multi-tier environment. Furthermore, it may happen that the client and server of a particular installation both reside in the same physical device, in which case a network connection is not required. (Thus, a potential target system being interrogated may be the local device on which an implementation of the present invention is implemented.)

The present invention is a web-based tool that helps marketers and agencies make their location data accurate, accessible and usable. The present invention embodies a set of tools to improve and prepare data using structured and repeatable workflows. The management system of the present invention maintains a central, authoritative repository of location data that can be accessed and manipulated by a user while making that data available across digital marketing channels such as search, social, maps, and mobile access points.

While there have been described above the principles of the present invention in conjunction with a localization management system and its associated methodology, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features that are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The Applicant hereby reserves the right to formulate new claims to such features and/or combinations of such features during the prosecution of the present application or of any further application derived therefrom.

We claim:

1. A system for management of localization data to improve performance of an information processing system configured to execute geospatial operations, the system comprising:
 a processor; and
 a memory, coupled to the processor, storing a program, wherein when the processor executes the program, the system performs:
  importing a primary set of locational data associated with locations of a plurality of entities;
  for each of the plurality of entities, mapping the primary set of locational data to a plurality of fields, wherein the plurality of fields includes at least one geospatial data field for each of the plurality of entities;
  importing a secondary set of locational data associated with the plurality of entities into electronic memory, wherein the secondary set of locational data includes a plurality of third party locational data sets associated with the locations of the plurality of entities and (ii) the secondary set of locational data includes geospatial data that more accurately represents the geospatial location of one or more of the plurality of entities than the primary set of locational data;
  generating a geospatial metric by comparing the values in the at least one geospatial data field for each of the plurality of entities in the primary set of location data with corresponding geospatial data values in the secondary set of locational data for the plurality of entities, wherein the geospatial metric is automatically generated in the computer system based on a degree of differences between the geospatial data for the plurality of entities described by the secondary set of locational data and the geospatial data of the plurality of entities as described by the primary set of locational data;
  responsive to the geospatial metric reaching a predefined threshold, creating automatically generating a modified primary set of locational data having corrected geospatial data for one or more of the plurality of entities, wherein the modified primary set of electronic location data is generated based on differences between the geospatial data of the entity as described by the secondary set of locational data and the geospatial data of the entity as described by the primary set of locational data stored in electronic memory; and
  exporting the modified primary set of locational data to an electronic processing system configured to execute geospatial operations using the modified primary set of locational data, wherein accuracy of the geospatial operations executed by the electronic processing system are enhanced through use of the modified primary set of locational data.

2. The system for management of localization data according to claim 1, wherein the plurality of fields includes at least one field descriptive of each of the plurality of entities, wherein the at least one field descriptive of each of the plurality of entities includes a field selected from one or more of a business telephone number, hours of operation, a business address, a business name, or a business brand.

3. The system for management of localization data according to claim 2, wherein when the processor executes the program, the system further performs:
 generating an external metric by comparing descriptive data in the secondary set of locational data for the plurality of entities with values of the descriptive data in the descriptive data fields in the primary set of locational data for the plurality of entities.

4. The system for management of localization data according to claim 1, wherein the secondary set of locational data includes a plurality of secondary sets of geospatial coordinates.

5. The system for management of localization data according to claim 1, wherein the modified primary set of locational data includes a modified set of geospatial data based on a weighted difference between the geospatial data for the plurality of entities in the primary set of locational data and the geospatial data for the plurality of entities in the secondary set of locational data for the plurality of entities.

6. The system for management of localization data according to claim 5, wherein the modified primary set of geospatial coordinates is based on a weighted combination of differences between the geospatial data for an entity in the primary set of locational data and each of the geospatial data for the entity in the third party locational data sets.

7. The system for management of localization data according to claim 1, further comprising normalizing the modified primary locational set of data to a predefined format set of primary data.

8. The system for management of localization data according to claim 7, further comprising exporting the predefined format set of primary locational data to the electronic processing system, wherein the electronic processing system implements a marketing platform facilitating electronic location of an entity by a consumer.

9. The system for management of localization data according to claim 1, further comprising collecting the secondary set of locational data from the plurality of third parties, wherein the secondary set of locational data includes at least one set of locational data downloaded from a public search engine platform.

10. The system for management of localization data according to claim 1, wherein when the processor executes the program, the system further performs:
> generating a composite score indicative of overall robustness of the primary set of location data based on an external metric score and a completeness metric score, wherein the completeness metric score corresponds to data fields in the primary set of locational data that are missing values.

\* \* \* \* \*